(12) United States Patent
Zayeratabat

(10) Patent No.: US 6,299,125 B1
(45) Date of Patent: Oct. 9, 2001

(54) TREE SUPPORT APPARATUS

(76) Inventor: Esmail Zayeratabat, 2495 Kingfield Way, San Jose, CA (US) 95124

( * ) Notice: Subject to any disclaimer, the term of this patent is extended or adjusted under 35 U.S.C. 154(b) by 0 days.

(21) Appl. No.: 09/340,280

(22) Filed: Jun. 25, 1999

(51) Int. Cl.$^7$ ................................................. F16M 13/00
(52) U.S. Cl. .......................... 248/530; 248/218.4; 47/43; 47/42; 47/47
(58) Field of Search ..................... 248/530, 540, 248/541, 405, 413, 218.4, 545; 47/42, 43, 42 R, 47

(56) References Cited

U.S. PATENT DOCUMENTS

| | | | | |
|---|---|---|---|---|
| 500,140 | * | 6/1893 | Kruger | 47/47 |
| 1,894,743 | * | 1/1933 | Harter | 248/413 |
| 3,010,256 | * | 11/1961 | Ise | 47/42 |
| 3,521,401 | * | 7/1970 | Shisler | 47/43 |
| 4,176,494 | * | 12/1979 | Boucher et al. | 47/47 |
| 4,249,342 | * | 2/1981 | Williams | 47/43 |
| 4,480,403 | * | 11/1984 | Williams | 47/42 |
| 4,649,666 | * | 3/1987 | Ness et al. | 47/43 |
| 4,745,706 | | 5/1988 | Muza et al. | 47/47 |
| 4,870,781 | * | 10/1989 | Jones | 47/43 |
| 4,897,956 | * | 2/1990 | McGuire | 47/43 |
| 5,199,677 | * | 4/1993 | Sessions | 248/218.4 |
| 5,263,279 | * | 11/1993 | Delsanne et al. | 47/70 |
| 5,349,780 | | 9/1994 | Dyke | 47/47 |
| 5,395,018 | * | 3/1995 | Studdiford | 248/229 |
| 5,402,600 | * | 4/1995 | Tompkins | 47/42 |
| 5,605,010 | | 2/1997 | Furlong et al. | 47/48.5 |
| 5,881,495 | * | 3/1999 | Clark | 47/48.5 |

* cited by examiner

*Primary Examiner*—Anita King
*Assistant Examiner*—Gwendolyn Baxter
(74) *Attorney, Agent, or Firm*—Henry M. Stanley

(57) ABSTRACT

Structure is disclosed for supporting immature plants and small trees to assure straight and healthy stem and trunk growth until the stem and/or trunk reaches a growth phase where it is self-supporting. Several embodiments of two part stakes are discussed including detachable upper and lower portion stakes and telescoping upper and lower portion stakes. Plant feeding features in the stakes are described and structure for providing cooperating stake pairs with novel interconnecting straps and stem/trunk engaging apparatus is disclosed. Stabilizing structure for the stakes is also disclosed, so that stem trunk support is strong enough to accomplish the intended purpose.

25 Claims, 4 Drawing Sheets

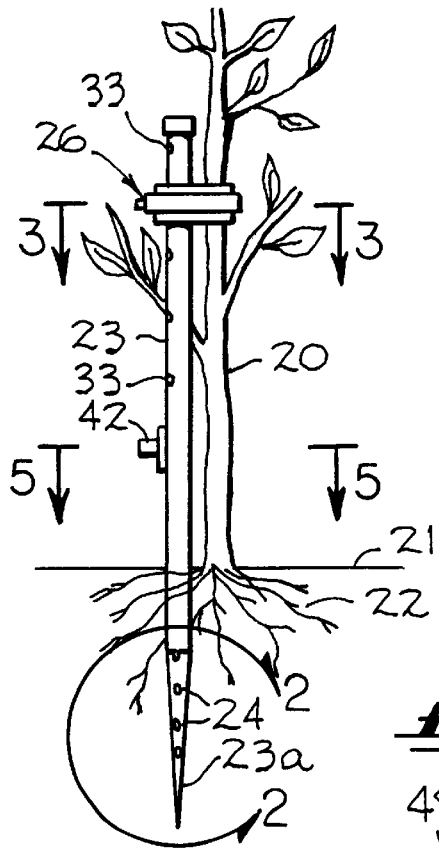
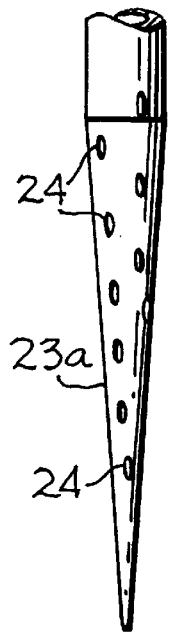
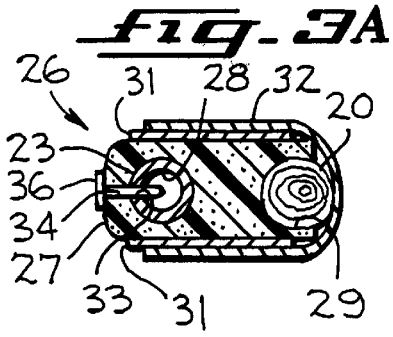
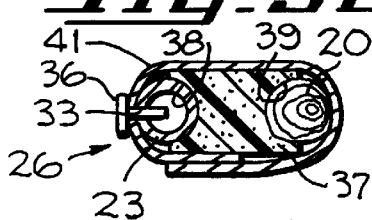
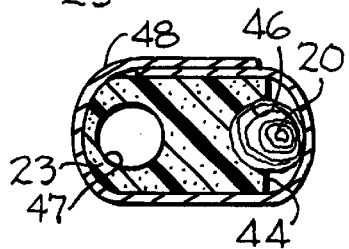
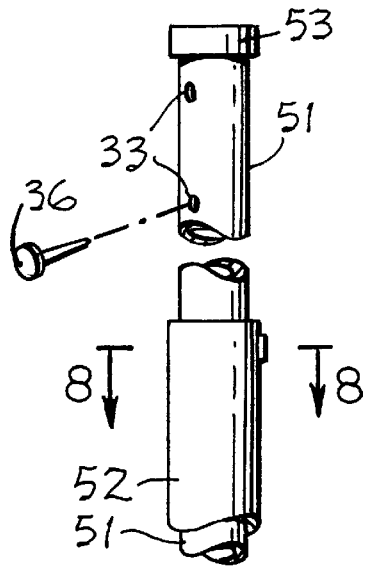
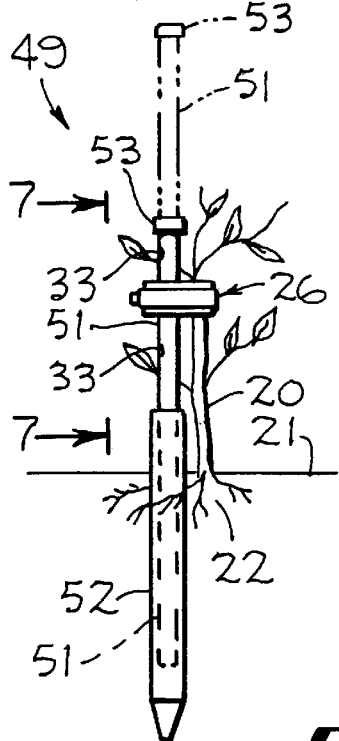
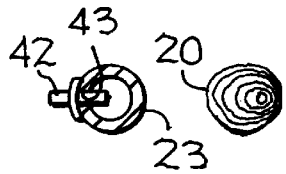
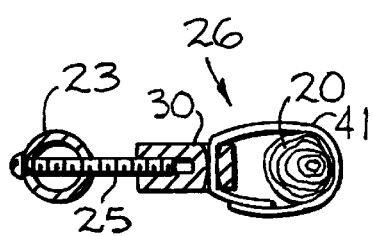

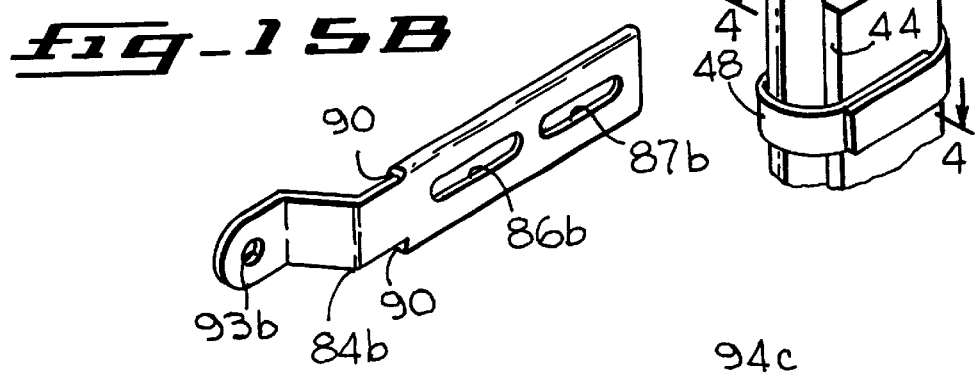
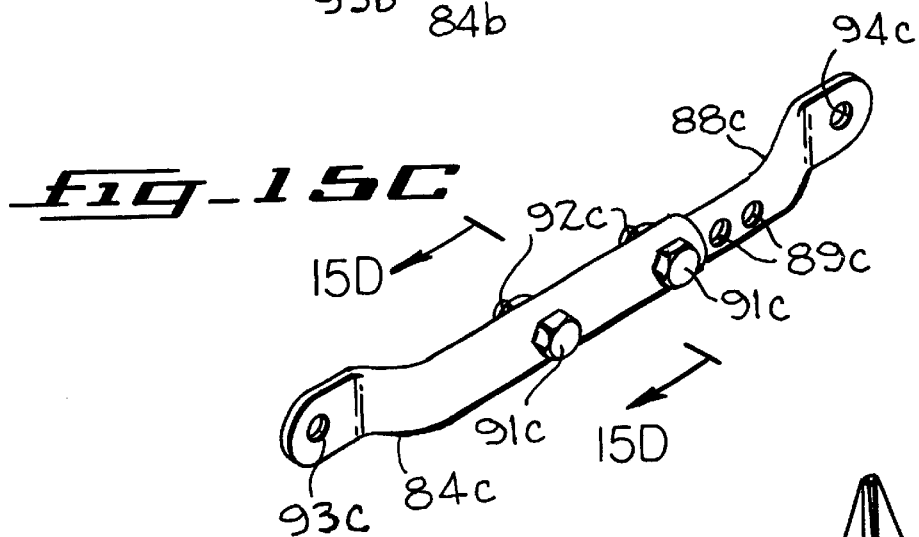
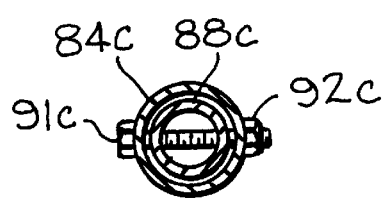
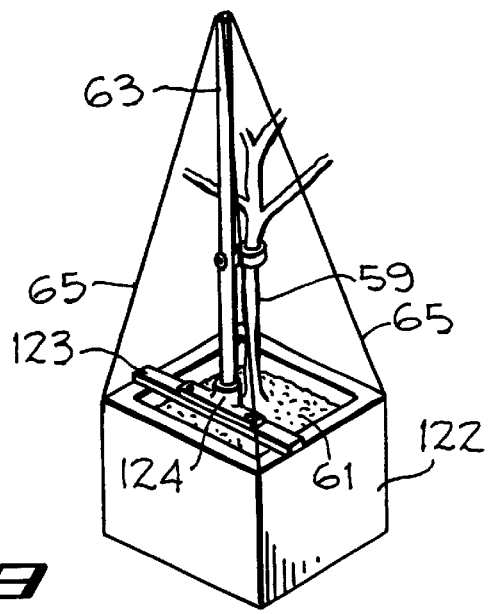

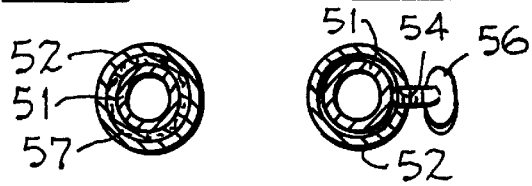
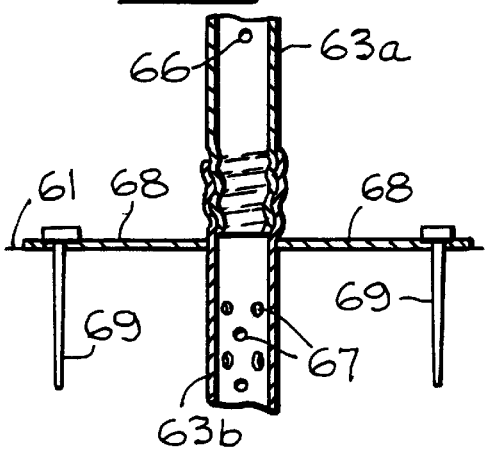
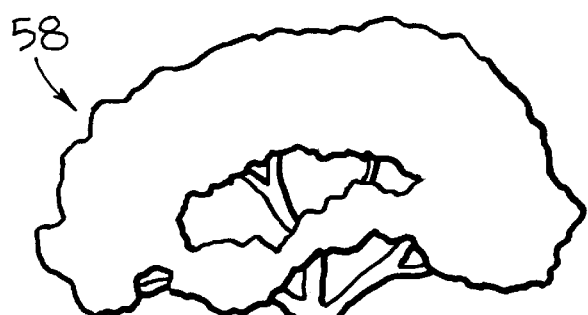
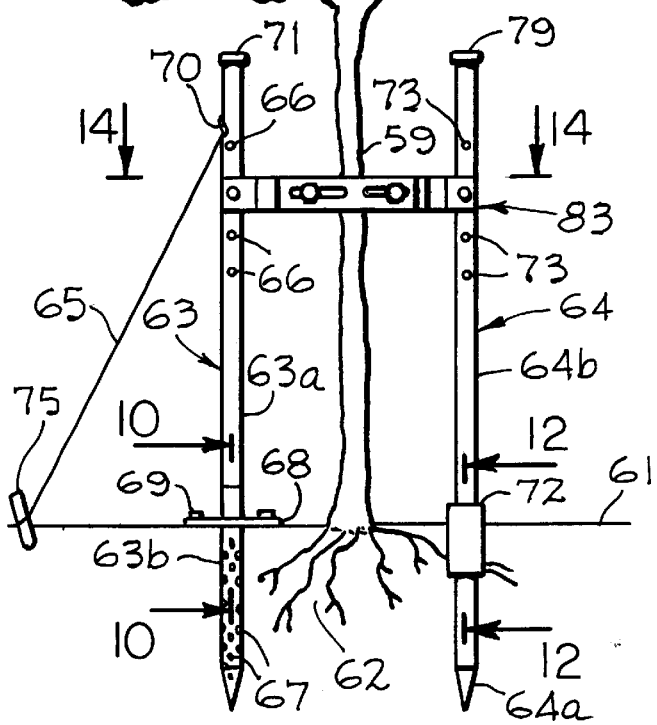
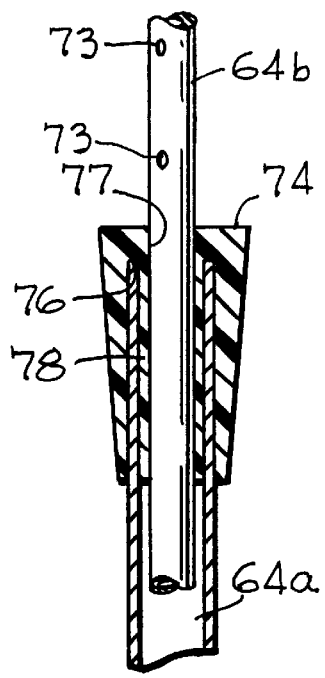

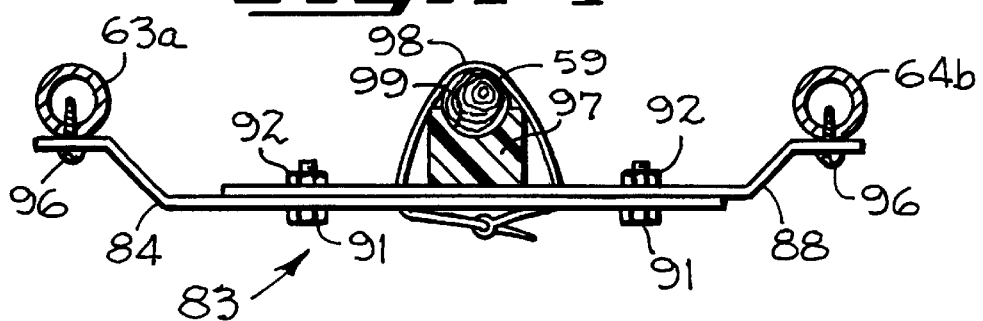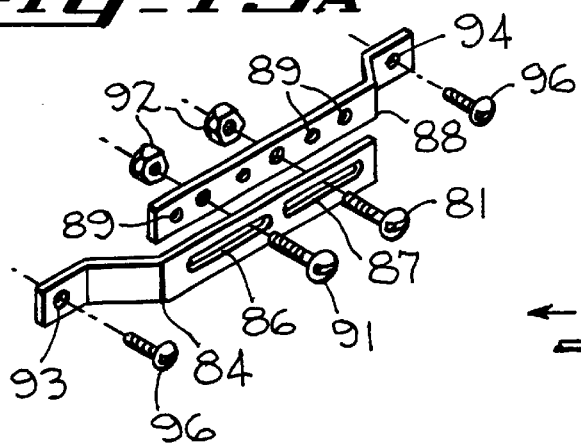

TREE SUPPORT APPARATUS

SUMMARY OF THE INVENTION

One aspect of the invention disclosed herein relates to apparatus for supporting a trunk portion on a tree growing in underlying soil which has a left stake with a lower portion for entering the underlying soil on one side of the tree and a right stake having a lower portion for entering the underlying soil at a distance from the left stake on the opposing side of the tree. A bracket is provided for spanning the distance between and connecting the left and right stakes. Means is provided on the bracket for adjusting the bracket to fit the distance between the stakes. Further, means for engaging the trunk portion is included together with means for securing the means for engaging to the bracket.

In another embodiment of the disclosed invention, apparatus is provided for supporting a trunk portion of a plant growing in underlying soil which includes an upper stake length, a lower stake length having an upper end, wherein the upper end is configured to receive the upper stake length in telescoped position. The upper and lower stake lengths have adjacent surface portions when assembled in the telescoped position. Means is also included for fixing the upper and lower stake lengths in infinitely adjustable telescoped position.

In yet another aspect of the invention, apparatus is provided for supporting a trunk portion of a plant, which is positioned adjacent to a supporting stake. A cushion is disposed between and in contact with the supporting stake and the trunk portion. Means is provided for securing the cushion rotationally on the supporting stake and means is also provided for securing the trunk portion in contact with the cushion.

In an additional embodiment of the invention, apparatus is disclosed for supporting a trunk portion on a plant which includes a supporting stake, wherein the supporting stake has a trunk portion receiving groove formed on the outside surface of and along a length of the stake. Further, means is attached to the supporting stake for retaining the trunk portion of the plant within the trunk portion receiving groove.

In still another embodiment of the invention, apparatus is disclosed for supporting a trunk portion of a plant extending upwardly from an underlying surface, wherein an upper stake portion has an upper end and a lower end. A lower stake portion has an upper end and a lower end. Means is provided for releasably connecting the upper stake portion lower end to the lower stake portion upper end, so that the upper stake portion also extends upwardly. In addition, means is provided extending laterally from the lower stake portion upper end for contacting the underlying surface to thereby provide a stabilizing feature for the upper stake portion when the upper and lower stake portions are connected together.

BRIEF DESCRIPTION OF THE DRAWINGS

FIG. 1 is an elevation of one embodiment of the present invention.

FIG. 2 is an detail from 2—2 of FIG. 1.

FIGS. 3A, 3B and 3C are alternative embodiments of the present invention taken along the line 3—3 of FIG. 1.

FIG. 4 is a section through one embodiment of the present invention.

FIG. 5 is a section along the line 5—5 of FIG. 1.

FIG. 6 is an elevation of an alternative embodiment of the present invention.

FIG. 7 is a partial view along the line 7—7 of FIG. 6.

FIGS. 8A are 8B and sections of alternative embodiments viewed along the line 8—8 of FIG. 7.

FIG. 9 is an elevation of yet another embodiment of the present invention.

FIG. 10 is a section along the line 10—10 of FIG. 9.

FIG. 11 is a perspective of one form of end cap used in the present invention.

FIG. 12 is a section along the line 12—12 of FIG. 9.

FIG. 13 is an elevation of another end cap used in the present invention.

FIG. 14 is a view along the line 14—14 of FIG. 9.

FIG. 14A is a section through another embodiment of a cushion utilized in the present invention.

FIGS. 15A, 15B and 15C are perspectives of the apparatus shown in FIG. 14.

FIG. 15D is a section along the line 15D—15D of FIG. 15C.

FIG. 16 is partial view of a tie used in the present invention.

FIG. 17 shows another tie used in the present invention.

FIG. 18 is a partial elevation of yet another embodiment of the present invention.

FIG. 19 is a perspective of another aspect of the present invention.

DESCRIPTION OF THE PREFERRED EMBODIMENTS

Young plants and trees often require support until they reach a level of maturity where the plant stem or tree trunk is able to support the plant or tree by itself. Support for a plant stem or a tree trunk must take into consideration the relatively rapid growth of young plants and trees and while providing support must not hinder growth.

In FIG. 1 of the drawings, a young plant or tree 20 is shown growing from an underlying layer of soil 21. The plant has a root system shown generally at 22 beneath the surface 21 of the soil. A support stake 23 is shown having a lower portion 23a embedded within the underlying layer of soil 21. The lower portion 23a of the stake is shown in detail in FIG. 2. It may be seen that the lower end of the portion 23a is relatively pointed and the stake 23 is tapered from the full stake width to the point at the lower end of 23a FIG. 2 also depicts a plurality of holes 24, which appear in one embodiment of this invention, in the surface of the lower stake portion 23a. The stake 23 and lower portion 23a are hollow and tubular as depicted in FIGS. 1 and 2. The holes 24 extend through a wall of the tubular stake for a purpose to be hereinafter described.

FIG. 1 also shows a structure 26, which operates to secure the stem of the plant to the stake 23. The structure 26, which serves to secure the stem of the plant 20 to the stake 23, is shown in one embodiment in the section of FIG. 3A. As seen in FIG. 3A, a cushion 27 has a hole 28 therethrough, which accepts the stake 23. The cushion 27 is made of some shock absorbing material, such as plastic foam. The cushion 27 further has a U-shaped depression 29 at one side, which is adapted to receive the stem or trunk of the plant 20. A piece of hook and loop type fastener (i.e., the "hook" side) 31 is shown attached to opposing sides of the cushion member 27. A strip of the other portion of a "hook and loop" type fastener (i.e., the loop side) 32 is shown extending from one side of the cushion member around the stem of the plant 20 and being attached to the opposite side of the cushion member. In this fashion, the stem of the plant 20 is captured within the U-shaped groove 29 in the cushion member 27 and secured in the proximity of, but spaced from the stake 23. The stake 23 has a vertical line of spaced holes 33 as seen in FIG. 1, one of which is shown in FIG. 3A. A hole 34 is punched in the cushion member 27 and when the holes 34 and 33 are in alignment a pin 36 is pressed through the aligned holes to retain cushion 27 rotationally on the stake 23. It may also be seen that the pin 36 retains the cushion 27 vertically on the stake 23.

An alternative embodiment shown in FIG. 3B depicts a cushion member 37, also made of some shock absorbing material such as plastic foam, having opposing U-shaped grooves 38 and 39 therein. The stake 23 is engaged in the U-shaped depression 38 and the trunk of the plant 20 is shown engaged in the U-shaped depression 39 thereon. A tie, for example, a strip of hook and loop type fastener as shown at 41 in FIG. 3B, is wrapped around the stake 23, the plant 20 and the cushion 37 so that the ends of the strip 41 overlap and are thereby held together in a known fashion for hook and loop type fasteners. The pin 36 described in conjunction with FIG. 3A is punched through the securing strip or tie 41 and also through one of the holes 33 positioned in spaced vertical locations along the stake 23. The spaced holes 33 may be four to six inches apart, thereby allowing for selection of appropriate vertical position for the tie assembly 26. As described in conjunction with FIG. 3A, the embodiment of FIG. 3B provides for rotational stability of the tie assembly 26 on the stake 23 as well as fixed vertical positioning.

An additional alternative to the tie assemblies 26 of FIGS. 3A and 3B is shown in FIG. 3C. A threaded member 25 is shown captured within stake 23, extending laterally therefrom. The threaded member engages internal threads in a block 30 so that the block 30 is moved toward and away from the stake 23 by turning the threaded member about the thread axis. A slot is shown in the block 30 for receiving a tie similar to tie 41 (FIG. 3B) therethrough. The tie is disposed to surround the plant stem 20 to stabilize the stem.

In the section of FIG. 5, an inlet pipe 42 is shown extending through a hole 43 in the wall of the stake 23 and also extending far enough outwardly from the wall of the stake to be accessible. The inlet pipe 42 provides access to the interior of the hollow stake 23 so that water and/or plant food is disposed therein and may consequently exit from the holes 24 in the lower portion 23a of the stake. The consequent deposit of water and plant food in the area of the root system 22 of the plant provides stimulus for plant growth. Further, the tapered lower portion 23a of the stake 23 provides relatively easy access for the stake in penetrating into the underlying layer of soil 21. The lower portion 23a of the stake typically penetrates 12–18 inches into the underlying layer of soil depending to some extent on the size of the plant 20 being supported. It may further be seen in FIG. 5 that while supported by the stake 23, the stem 20 of the plant is spaced therefrom.

FIG. 4 shows an additional embodiment of the present invention wherein the stake 23 itself assumes a cross section having a wall 44 which extends outwardly toward one side, in which is formed an outwardly facing U-shaped groove 46 adapted to receive the stem or trunk of a plant 20 as shown. A centrally disposed cylindrical channel 47 runs along the length of the stake 23 in the embodiment of FIG. 4. The vertical line of holes 33 (is shown in FIG. 1) may be included in the stake configuration of FIG. 4. Another strip of "hook and loop" type fastener 48 is shown wrapped around the body of the stake 23 and the stem 20 of the plant to thereby secure the stem 20 within the U-shaped groove 46. The pin 36, mentioned before in conjunction with the embodiments of FIGS. 3A and 3B, may be used to pierce the strip 48 and pass through one of the holes 33 to thereby fix the tie 48 vertically on the stake. The ends of the "hook and loop" fastener overlap and adhere to one another in a known fashion. The stake 23 in the embodiment of FIG. 4 is ideally fabricated of extruded plastic, but could as well be formed from extruded metal tubing.

Turning now to FIG. 6 of the drawings, an infinitely adjustable length telescoping stake assembly shown generally at 49 is depicted. The telescoping stake assembly 49 has an upper stake length 51 and a lower stake length 52. When the upper stake length 51 is removed from the lower stake length 52 a cap similar to that shown at 53 is placed over the opening in the lower stake length to bar debris from failing inside the lower stake portion. The upper stake 51 is shown in solid lines in FIG. 6 in a relatively telescoped position and in phantom lines in a relatively extended position. Structure is provided adjacent to the upper end of the lower stake length 52 for receiving the upper stake length 51 and for providing a friction fit as well as infinitely variable extension for the upper stake portion 51 from the lower stake portion 52. A plant tie assembly such as the assembly 26 seen in FIG. 1 is employed in the embodiment of FIG. 6 to space from and support a plant stem 20. The plant tie assembly 26 as utilized in the embodiment of FIG. 6 is described in the various embodiments of FIGS. 3A, 3B, 3C and 4 hereinbefore.

With reference to FIG. 7, the embodiment of FIG. 6 is shown in greater detail. The upper stake length 51 has a cap 53 attached to the upper end thereto to provide closure and prohibit debris from entering the inside of the upper stake length. The upper stake length has the series of holes 33 described hereinbefore for receiving the pin 36 for the purposes described in conjunction with FIGS. 3A and 3B earlier. Further detail for the embodiment of FIGS. 6 and 7 is seen in FIG. 8B wherein a threaded hole 54 is formed in the wall of the lower stake length 52 and a threaded member 56 having threads matching the threads in hole 54 is engaged therein. As seen in FIG. 8B when the threaded member is advanced in the threaded hole 54, the free end of the threaded member comes into frictional contact with the outside surface of the upper stake length 51. In this fashion, the upper stake length 51 is infinitely variable in its extension above the upper end of the lower stake length 52 by positioning the upper stake length at a desired position and advancing the threaded member 56 to bear against the surface thereof.

An alternative embodiment of the manner of infinitely varying the extension of the upper stake length 51 from the upper end of the lower stake length 52 is shown in FIG. 8A. A cylindrical resilient gasket 57 is disposed between the inner wall of the lower stake length 52 and the outer wall of the upper stake length 51. The wall thickness of the resilient gasket is such as to place the gasket in compression when the upper and lower stake lengths are assembled as shown. Infinite vertical positioning is possible for the telescoping upper stake length 51 within the limits of the length of the upper stake that the lower stake length 52 will accept. The upper stake length 51 is movable against the friction provided between the adjacent surfaces of the two stake lengths and the cylindrical resilient gasket 57, but the friction is sufficient to thereafter maintain the upper stake length in vertical position after it has been moved to the optimum extension length from the lower stake portion.

FIG. 9 shows a large plant or tree 58 having a trunk portion 59 planted within an underlying layer of soil 61 and having a root system 62 within the soil layer. As viewed in the FIG., there is a left support stake 63 and a right support stake 64. The left and right stakes 63 and 64 are described herein as different embodiments, although it will be understood that two stakes of either embodiment are useful in the trunk support system subsequently described. Support stake 63 has an upper portion 63a and a lower portion 63b, which are joined together at or near the surface of the underlying soil layer 61. FIG. 10 shows one structure for joining the upper and lower portions 63a and 63b together. The stake 63 is tubular in this embodiment having external threads formed on a lower end of upper stake portion 63a and internal threads formed on an upper end of lower stake portion 63b. Thus, a threaded connection is provided between stake portions 63a and 63b. It should further be noted that upper stake portion 63a has a vertical line of spaced holes 66 therein. A plurality of holes 67 is formed around the circumference of the lower stake portion 63b as is shown in both FIGS. 9 and 10. Attached near the upper portion of the lower stake member 63b is a laterally extending flange 68 which, as depicted, extends to each side of the lower stake length 63b. The configuration of flange 68 is variable, assuming legs 120° apart; legs extending in diametrically opposed directions, etc. The flange 68 is shown in FIG. 10 lying on top of the underlying soil layer 68 and having spikes 69 extending therethrough into the soil layer for providing stability to the stake assembly 63. A cap is placed on top of the upper end of the upper stake length 63a, which may take the form of the cap 71 shown in FIG. 11. A notch 70 is formed in the upper portion 63a of stake 63, which is configured so that the upper end of a guy wire or cable 65 is fixed therein. A lower end of the guy wire is attached to a stake 75 driven into the soil layer 61 for stabilizing the stake 63 in substantially vertical position.

The right stake assembly 64 has a lower portion 64a extending into the underlying layer of soil 61 and an upper portion 64b extending upwardly from the underlying soil layer and spaced from the trunk 59. Structure providing for infinitely variable adjustment of the extension of the upper stake portion 64b from the lower stake portion 64a is shown at 72 in FIG. 9. This structure 72 may alternatively assume the form of that shown and described with reference to FIG. 8A or that shown and described with reference to FIG. 8B hereinbefore. Additionally, the structure 72 may assume the form shown in FIG. 12 wherein the upper stake length 64b has a vertical line of spaced holes 73 through the wall thereof, upper stake portion 64b being a length of tubing in this embodiment. A resilient gasket assembly 74 is further shown in FIG. 12 having an upwardly extending blind annulus 76 therein which is formed to fit over the upper end of the lower stake length 64a. A centrally located cylindrical passage 77 extends through the resilient gasket 74 resulting in a tubular portion 78 in the gasket residing between the upwardly extending annulus 76 and the centrally located passage 77. When the gasket 74 is assembled over the upper end of the lower stake length 64a and the upper stake length 64b is inserted through the centrally located cylindrical passage as seen in FIG. 12, the tubular portion 78 of the gasket is in compression resulting in a friction force between the lower and upper stake lengths 64a and 64b. The friction force is overcome by manually adjusting the extension of the upper stake length 64b from the upper end of the lower stake length 64a and the aforementioned friction retains the upper stake length 64b in the infinitely adjustable position. A cap or plug 79 is shown in FIG. 13, which may be used as an alternative to the cap 71 of FIG. 11 to close the upper opening at the top of upper stake length 64b. The cap or plug 79 has a shank 81, which fits within the inside diameter of the upper stake length 64b and a shoulder 82 which rests against the upper end thereof.

FIG. 14 shows an adjustable strap assembly 83 extending between the upper stake lengths 63a and 64b. Several embodiments of the strap assembly or portions thereof are shown in exploded view in FIGS. 15A, 15B and 15C. In FIG. 15A an outer strap portion 84 has a pair of elongated openings 86 and 87 therein. An inner strap portion 88 has a line of holes 89 in registration with the elongated openings 86 and 87. Fasteners such as the bolts 91 in FIG. 15 are passed through the elongated openings 86 and 87 and through selected ones of the line of registered holes 89 to be engaged by nuts 92. In this fashion, the outer and inner strap members 84 and 88 are slidable laterally to assume a desired overall length and the nuts 92 are tightened on the bolts 91 to fix the strap assembly 83 in that desired length. A hole 93 is formed in the outer end of the outer strap member 84 and a hole 94 is formed in the outer end of the inner strap member 88. Fasteners, such as screws 96 seen in FIGS. 14 and 15A are passed through the holes 93 and 94 to engage selected ones of the holes 66 and 73, (FIG. 9) respectively, in the upper stake lengths 63a and 63b, to fix the strap assembly 83 in a desired vertical position on the left and right stakes.

FIG. 15B shows an outer strap portion 84b that is configured with upper and lower extending edges 90 that function to capture the upper and lower edges of the inner strap portion 88 (FIG. 15 A). Features 93b, 86b and 87b in FIG. 15B correspond to features 93, 86 and 87 respectively in FIG. 15A. The extending edges 90 provide greater strength in the strap assembly 83 for resisting loads applied to the upper and lower edges of the strap assembly.

FIG. 15C shows another configuration of the strap assembly 83 wherein an outer strap portion 84c has a tubular body portion at one end and a flattened portion at the other end with a through hole 93c therein. An inner strap portion 88c has a tubular portion at one end and a flattened portion at the other end with a through hole 94c therein. The tubular portion of the inner strap 88c is configured to fit within the tubular portion of the outer strap 84c as seen in FIG. 15D. A line of holes 89c is formed in the inner strap portion A pair of through holes (not shown) is formed in the tubular portion of the outer strap 84c through which bolts 91c are passed. The holes for the bolts 91c are spaced so that they overlie a pair of the holes in the line of holes 89c. Thus, the bolts 91c are passed through the outer strap portion 84c and the inner strap portion 88c and fixed in place by nuts 92c as seen in FIGS. 15C and 15D. The strap assembly length is therefore adjustable by selecting the holes 89c through which the bolts 91c are passed. The function of features 93c, 94c, 88c and 84c are the same as the function of features 93, 94, 88 and 84 respectively in FIG. 15A.

A cushion 97 is shown in FIG. 14 disposed between the inner strap portion 88 and the tree trunk 59. A tie 98 is shown extending around the tree trunk 59 and the cushion 97 to secure the tree trunk within a U-shaped depression 99 formed on the face of the cushion 97. The tie 98 is led through one of the holes 89 and aligned portions of the elongated apertures 86 and 87. The tie 98 has end configurations of known types, which facilitate fixing the tie ends together. One type of such a tie 98 is seen in FIG. 16 wherein a strap 101 is fixed at one end to a metal plate 103 by weaving the strap end through a trio of apertures 102 in the plate 103. The plate has a pivoting friction lock or friction latch member 104 at the opposite end thereof, underneath which the opposing end of the strap 101 is led so that tension on the strap fixes the strap in place. Alternatively, the tie 98 may take the form shown in FIG. 17. FIG. 17 shows a stretchable length 105 of an elastic material having a loop 106 at one end thereof and a free end which may be tied in a knot 107 as shown after the free end is drawn through the eye of the loop. Any means for preventing withdrawal of the free end of the stretchable length 105 is appropriate once it has passed through the eye of the loop 106. FIGS. 16 and 17 are but a pair of numerous ties 98 for affecting retention of the trunk 59 within the U-shaped groove 99 in cushion 97.

The cushion 97 seen in FIG. 14 is shown in FIG. 14A as 97*b* which is a variation on the configuration shown in FIG. 14. The U-shaped groove 99 is formed in one side of the cushion 97*b* and a pair of blind holes 100*a* and 100*b* is formed in the opposite side. Coil springs 105*a* and 105*b* are captured within the blind holes 100*a* and 100*b* respectively. The coil springs are intended to provide additional cushioning between the inner strap portion 88 and the tree trunk 59.

Larger trees and plants may use the embodiment of FIG. 18 wherein a stout stake 108 may assume the configuration of any of the stake assemblies described hereinbefore. A vertical line of holes 109, serving the purpose of the vertical lines of holes 66 and 73 in FIG. 9, for example, are formed in the stake 108. The stake 108 has an upper cap 111 thereon to keep debris from falling inside the stake if the stake assumes a tubular configuration. The stake 108 is inserted into an underlying layer of soil adjacent to a trunk 112 to be supported as hereinbefore described. A clamp 113 is positioned surrounding the periphery of the stake 108 and is held in predetermined vertical position thereon either by a clamping pressure against the outer surface of the stake or by inserting a pin 114 through a hole (not shown) in the clamp so that the pin passes through one of the series of vertically aligned holes 109. The clamp 113 in the embodiment of FIG. 18 has a lateral flange 116 thereon with a hole 117 through the flange. A cushion 118, for example a cushion having the configuration of cushion 37 in FIG. 3B, is positioned between the clamp 113 and the tree trunk 112. A tie 119 is extended around the tree trunk 112 and the clamp 113, passing through the hole 117 in flange 116 whereupon the ends of the tie are fixed together, for example, in the manner described in conjunction with FIGS. 16 and 17. As seen in FIG. 18, the tie is a configuration similar to that of FIG. 17, wherein a loop is formed on one end of the tie and the opposing end is passed through the loop and pinned as with a pin 121 to prevent the free end of the tie 119 from exiting the eye in the loop.

FIG. 19 shows the trunk 59 of a larger plant growing from the soil layer 61, which is contained within a planter box 122. A cross member 123 is attached at opposite ends to opposing upper edges of the planter box 122. A bracket 124 has a through hole for allowing the stake 63 to pass therethrough The bracket is attached to the cross member 123 in position so that the hole in the bracket surrounds the trunk 59 to afford stability to the upstanding stake 63. Additional stability for the stake is provided by guy wires 65 attached at an upper end to the top of stake 63 and at a lower end to the upper edge of the planter box 122. One or more guy wires may be used to obtain the appropriate stability for the stake 63 as seen in FIG. 19.

Although the best mode contemplated for carrying out the present invention has been shown and described herein, it will be understood that modification and variation may be made without departing from what is regarded to be the subject matter of the invention.

What is claimed:

1. Apparatus for supporting a trunk portion on a tree growing in underlying soil, comprising left stake having a lower portion for entering the underlying soil on one side of the tree, a right stake spaced a distance from said left stake and having a lower portion for entering the underlying soil on the opposing side of the tree, a bracket for spanning said distance between and for connecting said left and right stakes, means on said bracket for adjusting said bracket to fit said distance, means on said bracket for engaging the trunk portion, and means for securing said means for engaging to said bracket, wherein said left and right stakes further comprise telescoping upper and lower stake portions having adjacent upper and lower surface portions respectively, and means for fixing said telescoping upper and lower stake portions in infinitely variable relative positions along said adjacent upper and lower surface portions, wherein said means for fixing comprises gasket means disposed between said upper and lower stake portions for simultaneously contacting said adjacent upper and lower surface portions and providing friction contact therebetween.

2. The apparatus of claim 1 wherein said lower portion on said left and said right stakes have perforations therein.

3. The apparatus of claim 1 wherein said gasket means comprises a cylindrical resilient length of tube.

4. The apparatus of claim 1 wherein said gasket means comprises a resilient body having an upper end and a lower end and further having a blind upwardly extending annulus in said lower end and a centrally located through cylindrical passage, said blind upwardly extending annulus being configured to fit over an upper end on said lower stake surface portion and said through cylindrical passage being configured to friction fit over said upper stake surface portion.

5. The apparatus of claim 6 wherein said bracket comprises a pair of rigid members having overlying perforations therein when assembled, and wherein said means for adjusting comprises fasteners extending through said overlying perforations for fixing said pair of rigid members to have a length spanning said distance, and means for fastening opposing ends of said bracket to said left and right stakes.

6. The apparatus of claim 5, wherein said pair of rigid members comprises telescoping rigid members.

7. The apparatus of claim 1 wherein said means for securing comprises a tie surrounding said means for engaging said bracket and the trunk.

8. Apparatus for supporting a trunk portion on a tree growing in underlying soil, comprising a left stake having a lower portion for entering the underlying soil on one side of the tree, a right stake spaced a distance from said left stake and having a lower portion for entering the underlying soil on the opposing side of the tree, a bracket for spanning said distance between and for connecting said left and right stakes, means on said bracket for adjusting said bracket to fit said distance, means on said bracket for engaging the trunk portion, and means for securing said means for engaging to said bracket wherein said means for engaging comprises a cushion positioned between and in contact with said bracket and the trunk, and means for resisting and absorbing compression forces exerted on said cushion.

9. The apparatus of claim 8 wherein said means for resisting and absorbing comprises at least one spring member positioned internally in said cushion.

10. Apparatus for supporting a trunk portion on a tree growing in underlying soil, comprising a left stake having a lower portion for entering the underlying soil on one side of the tree, a right stake spaced a distance from said left stake and having a lower portion for entering the underlying soil on the opposing side of the tree, a bracket for spanning said distance between and for connecting said left and right stakes, means on said bracket for adjusting said bracket to fit said distance, means on said bracket for engaging the trunk portion, and means for securing said means for engaging to said bracket, wherein said means for securing comprises a tie surrounding said means for engaging said bracket and the trunk, said tie comprising a strap, and a friction latch having mating portions attached to opposing ends of said strap.

11. Apparatus for supporting a trunk portion on a tree growing in underlying soil, comprising a left stake having a lower portion for entering the underlying soil on one side of the tree, a right stake spaced a distance from said left stake and having a lower portion for entering the underlying soil on the opposing side of the tree, a bracket for spanning said distance between and for connecting said left and right stakes, means on said bracket for adjusting said bracket to fit said distance, means on said bracket for engaging the trunk portion, and means for securing said means for engaging to said bracket wherein said means for securing comprises a tie surrounding said means for engaging said bracket and the trunk, said tie comprising a stretchable length having opposing ends, and means attached to said stretchable length for connecting said opposing ends.

12. The apparatus of claim 11 wherein said left and right stakes have upper and lower stake portions, and means for connecting said upper and lower stake portions in fixed position.

13. The apparatus of claim 12 wherein said upper and lower stake portions are tubular, whereby said lower stake portions have upper openings when said means for connecting is disconnected, comprising a cap attached to said lower stake portions for covering said upper openings.

14. Apparatus for supporting a trunk portion of a plant growing in underlying soil, comprising an upper stake.

a lower stake having an upper end configured to receive said upper stake length in telescoped position, said upper and lower stakes having adjacent upper and lower surface portions when assembled in telescoped position, and means for fixing said upper and lower stakes in infinitely adjustable telescoped position wherein said means for fixing comprises an annular resilient gasket formed to be disposed between and to contact said adjacent upper and lower surface portions and to provide friction force therebetween.

15. The apparatus of claim 14 wherein said annular resilient gasket comprises a body portion having an upper end and a lower end, said lower end having a blind upwardly extending annulus, said body portion further having a centrally located cylindrical passage therethrough, said blind upwardly extending annulus configured to fit over said lower stake upper end.

16. The apparatus of claim 14 comprising a cushion attached to said upper stake for contacting the trunk portion, and means for securing said cushion in place.

17. The apparatus of claim 14 comprising a trunk engaging strap forming a loop attached to said upper stake for surrounding the trunk portion, a block engaging one side of said loop, and means attached between said upper stake and said block for adjustably positioning said block toward and away from said upper stake.

18. Apparatus for supporting a trunk portion of a plant growing in underlying soil, comprising an upper stake, a lower stake having an upper end configured to receive said upper stake in telescoped position, said upper and lower stakes having adjacent surface portions when assembled in telescoped position, and means for fixing said upper and lower stakes in infinitely adjustable telescoped position, wherein the underlying soil has an upper surface, comprising at least one guy wire attached to and extending from an upper portion of said upper stake at one end, and means for securing an opposite end of said guy wire at the upper surface of the underlying soil.

19. The apparatus of claim 18 wherein a planter box contains the underlying soil, the planter box having upper box edges thereon, comprising a stake bracket having a hole therethrough for accepting passage of said upper and lower stake lengths, a support member fastened at opposing ends to opposing upper box edges, and means for fastening said stake bracket to said support member.

20. Apparatus for supporting a trunk portion of a plant adjacent a supporting stake, comprising a cushion disposed in contact with the supporting stake, means for securing said cushion rotationally on the supporting stake, and means in contact with said cushion for securing said cushion to the trunk portion.

21. The apparatus of claim 20 wherein said cushion has an opening therein for surrounding the supporting stake, and wherein said means in contact with said cushion comprises means for fixing said cushion vertically on the supporting stake.

22. The apparatus of claim 20 wherein said cushion comprises
- a shock absorbing body,
- a first portion of a hook and loop fastener attached to one side of said shock absorbing body,
- a second portion of a hook and loop fastener attached to an opposing side of said shock absorbing body, and
- a mating strip of a hook and loop fastener for attaching to and extending between said first and second portions, so that said mating strip encompasses the trunk portion.

23. The apparatus of claim 20 wherein said means for securing said cushion rotationally comprises
- a clamp for engaging the supporting stake, and wherein said means in contact with said cushion comprises
- means for tying, said last named means surrounding the trunk portion, the supporting stake and said cushion.

24. Apparatus for supporting a trunk portion of a plant extending upwardly from an underlying surface, comprising
- an upper stake portion having an upper end and a lower end, said upper stake portion having a notch therein toward said upper end,
- a lower stake portion having an upper end and a lower end,
- means for releasably connecting said upper stake portion lower end to said lower stake portion upper end so that said upper stake portion extends upwardly, and
- means extending laterally from said lower stake portion upper end for contacting the underlying surface for stabilizing said upper stake portion when said upper and lower stake portions are connected, further comprising
  - a guy length,
  - means attached to one end of said guy length for engaging said notch, and
  - means attached to an opposing end of said guy length for securing said opposing end in the underlying soil.

25. Apparatus for supporting a trunk portion of a plant extending upwardly from an underlying surface, comprising
- an upper stake portion having an upper end and a lower end,
- a lower stake portion having an upper end and a lower end,
- means for releasably connecting said upper stake portion lower end to said lower stake portion upper end so that said upper stake portion extends upwardly, and
- means extending laterally from said lower stake portion upper end for contacting the underlying surface for stabilizing said upper stake portion when said upper and lower stake portions are connected, wherein the plant is growing in a planter box having upper box edges and containing soil providing the underlying surface, further comprising
  - a stake bracket having a hole therein for accepting said upper and lower stake portions therethrough,
  - a support member fastened at opposing ends thereof to opposing upper box edges, and
  - means for fastening said stake bracket to said support member, additionally comprising
    - at least one guy wire attached to and extending from said upper stake portion upper end to one of the upper box edges.

\* \* \* \* \*